(12) United States Patent
Zeng

(10) Patent No.: US 12,222,777 B2
(45) Date of Patent: Feb. 11, 2025

(54) MAINBOARD MOUNTING MECHANISM AND ELECTRIC DEVICE

(71) Applicant: Lenovo (Beijing) Limited, Beijing (CN)

(72) Inventor: Jianguo Zeng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 221 days.

(21) Appl. No.: 17/944,129

(22) Filed: Sep. 13, 2022

(65) Prior Publication Data

US 2023/0138782 A1  May 4, 2023

(30) Foreign Application Priority Data

Oct. 28, 2021  (CN) .......................... 202111266211.6

(51) Int. Cl.
*G06F 1/18* (2006.01)
(52) U.S. Cl.
CPC .................... *G06F 1/184* (2013.01)

(58) Field of Classification Search
CPC ............................... G06F 1/1658; G06F 1/184
See application file for complete search history.

(56) References Cited

U.S. PATENT DOCUMENTS 10,863,647 B1 *  12/2020  Escamilla .............. H05K 5/023
2005/0155781 A1 *  7/2005  Kao ........................ H02G 3/20
174/50

\* cited by examiner

*Primary Examiner* — James Wu
(74) *Attorney, Agent, or Firm* — ANOVA LAW GROUP, PLLC

(57) ABSTRACT

A mainboard mounting mechanism is provided for use with a chassis box, the chassis box defining an accommodating space, the mainboard mounting mechanism including: a tray; a positioning post, positioned in the mounting area; and a rod assembly, rotatably connected to the tray, wherein the rod assembly drives the tray to slide toward the positioning post so as for the mainboard to be at a disengagement position, and the rod assembly drives the tray to slide away from the positioning post for the mainboard to be at an engagement position.

18 Claims, 7 Drawing Sheets

MAINBOARD MOUNTING MECHANISM AND ELECTRIC DEVICE

RELATED APPLICATION(S)

This application claims priority to Chinese Patent Application No. 202111266211.6 filed with the National Intellectual Property Administration, PRC on Oct. 28, 2021, which is incorporated herein by reference in entirety.

FIELD OF THE TECHNOLOGY

The present disclosure relates to the technical field of electronic devices, and in particular, to a mainboard mounting mechanism and an electronic device.

BACKGROUND

Mainboards on electronic devices (especially servers) are generally fixed on the chassis or the chassis box through trays. There are two handles on the mainboard for sliding the mainboard back and forth. The two handles can facilitate the sliding operation of the mainboard, however, placing the two handles on the mainboard will occupy a large space on the mainboard, which makes laying-out the mainboard more difficult.

SUMMARY

The present disclosure provides a mainboard mounting mechanism.

In one aspect, the present disclosure provides a mainboard mounting mechanism for use with a chassis box, the chassis box defining an accommodating space, the mainboard mounting mechanism including: a tray, slidably arranged in the accommodating space and divides the accommodating space into a mounting area and a sliding area along a sliding direction, the tray defines a holding space for holding a mainboard; a positioning post, positioned in the mounting area; and a rod assembly, rotatably connected to the tray, wherein the rod assembly drives the tray to slide toward the positioning post so as for the mainboard to be at a disengagement position, and the rod assembly drives the tray to slide away from the positioning post for the mainboard to be at an engagement position.

In certain embodiment(s), the rod assembly is positioned outside of the holding space.

In certain embodiment(s), the mainboard mounting mechanism further includes a guide member, defining a positioning hole, where the positioning post is received through the positioning hole for the guide member to be connected to the chassis box.

In certain embodiment(s), the guide member comprises a guide base and a guide rail extending from the guide base, and the positioning hole is defined on the guide base, and the tray is slidably connected with the guide rail.

In certain embodiment(s), the tray comprises a tray floor and a tray wall, the tray floor and the tray wall together define the holding space.

In certain embodiment(s), the mainboard mounting mechanism further includes a guide member, including a guide base and a guide rail extending from the guide base, where the tray includes a tray floor and a plurality of tray walls together defining the holding space, the plurality of tray walls include a proximal tray wall and a distal tray wall opposing the proximal tray wall, and where the guide rail extend from the proximal tray wall toward the distal tray wall.

In certain embodiment(s), an ear extends from the proximal tray wall and the rod assembly is positioned between the guide base and the ear.

In certain embodiment(s), the rod assembly includes a first part, including a first end, a second end, and a mounting portion positioned between the first end and the second end; and a second part, rotatably connected to the mounting portion of the first part.

In certain embodiment(s), the first end is rotatably connected to the guide base through a first rod.

In certain embodiment(s), the second part a third end and a fourth end, and the third end is rotatably connected to the mounting portion.

In certain embodiment(s), the mounting part divides the first part into a first segment and a second segment, the first segment is defined between the first end and the mounting portion, the second segment is defined between the mounting portion and the second end, when the first part rotates clockwise, an angle between the second part and the first segment gradually increases, and an angle between the second part and the second segment gradually decreases, and when the first part rotates counterclockwise, the angle between the second part and the first segment gradually decreases, and the angle between the second part and the second segment gradually increases.

In certain embodiment(s), a first buckle is present on the first part, and a second buckle is present on the tray, when the mainboard is at the engagement position, the first buckle is buckled with the second buckle.

In another aspect, the present disclosure provides an electronic device, the electronic device includes a chassis box and a mainboard mounting mechanism, the chassis box defining an accommodating space, and the mainboard mounting mechanism including: a tray, slidably arranged in the accommodating space and divides the accommodating space into a mounting area and a sliding area along a sliding direction, the tray defines a holding space for holding a mainboard; a positioning post, positioned in the mounting area; and a rod assembly, rotatably connected to the tray, wherein the rod assembly drives the tray to slide toward the positioning post so as for the mainboard to be at a disengagement position, and the rod assembly drives the tray to slide away from the positioning post for the mainboard to be at an engagement position.

In yet another aspect, the present disclosure provides a method of holding a mainboard to a chassis box through a mainboard mounting mechanism, the chassis box defining an accommodating space, the method including: providing the mainboard mounting mechanism, where the mainboard mounting mechanism includes: a tray, slidably arranged in the accommodating space and divides the accommodating space into a mounting area and a sliding area along a sliding direction, the tray defines a holding space for holding a mainboard; a positioning post, positioned in the mounting area; and a rod assembly, rotatably connected to the tray, wherein the rod assembly drives the tray to slide toward the positioning post so as for the mainboard to be at a disengagement position, and the rod assembly drives the tray to slide away from the positioning post for the mainboard to be at an engagement position.

BRIEF DESCRIPTION OF THE DRAWINGS

The following drawings are incorporated herein as a part of the present disclosure. The accompanying drawings illustrate certain embodiment(s) of the present disclosure, which explains the principles of the present disclosure.

REFERENCE NUMERALS IN THE DRAWINGS

Figure 1:
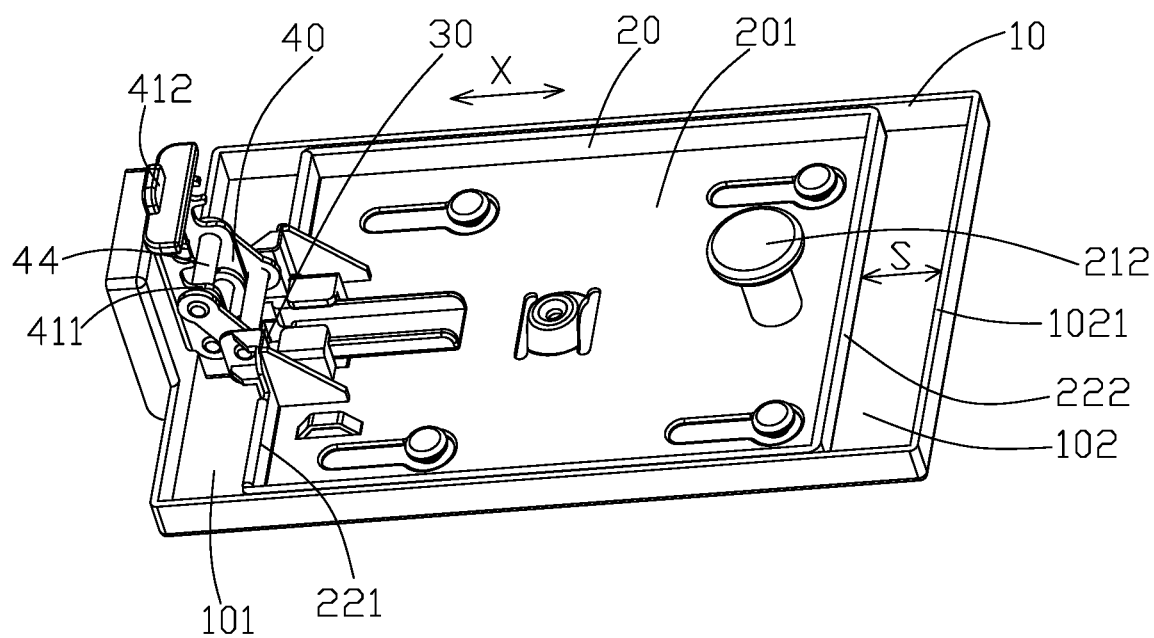
FIG. 1 is a schematic structural diagram of a mainboard mounting mechanism (the mainboard is at a disengagement position) according to certain embodiment(s) of the present disclosure.

10 Chassis box
401 Box floor
402 Box wall
1021 First box wall
11 Accommodating space
12 Positioning portion
13 Positioning column
101 Mounting area
102 Sliding area
20 Tray
201 Holding space
21 Tray floor
211 Slot hole
212 Handle
22 Tray wall
221 Proximal tray wall
2211 Ear
2212 Second buckle
222 Distal tray wall
23 Guiding groove
30 Positioning post
40 Rod assembly
41 First part
4101 First end
4102 Second end
411 Mounting portion
412 Handle portion
413 First buckle
42 First rod
43 Second part
4301 Third end
4302 Fourth end
44 Second rod
45 Third rod
50 Guide member
51 Guide base
511 Guide base floor
5111 Positioning hole
512 Guide base wall
52 Guide rail 521 Extending end

DETAILED DESCRIPTION

In the following description, details are provided in order to enable a thorough understanding of the present disclosure. It will be appreciated by those skilled in the art, however, that the following description is merely illustrative of alternative embodiments of the present disclosure and that the present disclosure may be practiced without one or more of these details. Also, some technical features known in the art are not detailed herein to avoid confusion with the present disclosure.

The mainboard mounting mechanism of the present disclosure is used to fix the mainboard inside the electronic device, and the electronic device can be a server, a computer, a TV, or the like, which are not listed here one-by-one, but the electronic device in the present disclosure is not limited to the above specific electronic device.

Figure 2:
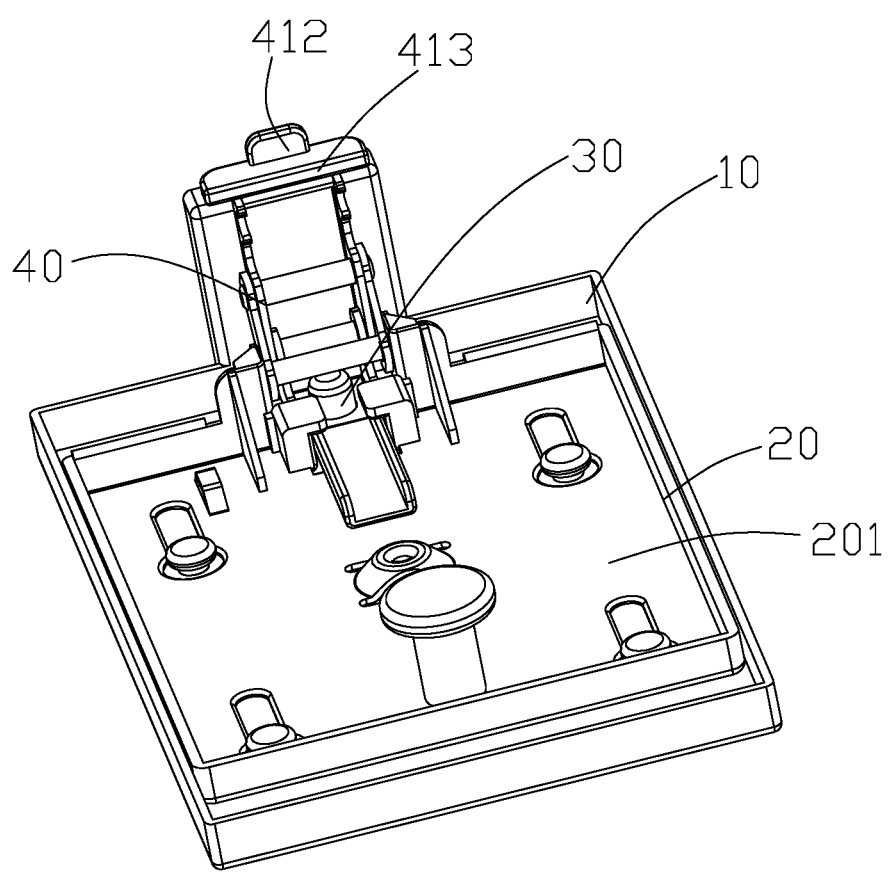
FIG. 2 is a schematic structural diagram of a mainboard mounting mechanism (the mainboard is at a disengagement position) according to certain embodiment(s) of the present disclosure.
Figure 3:
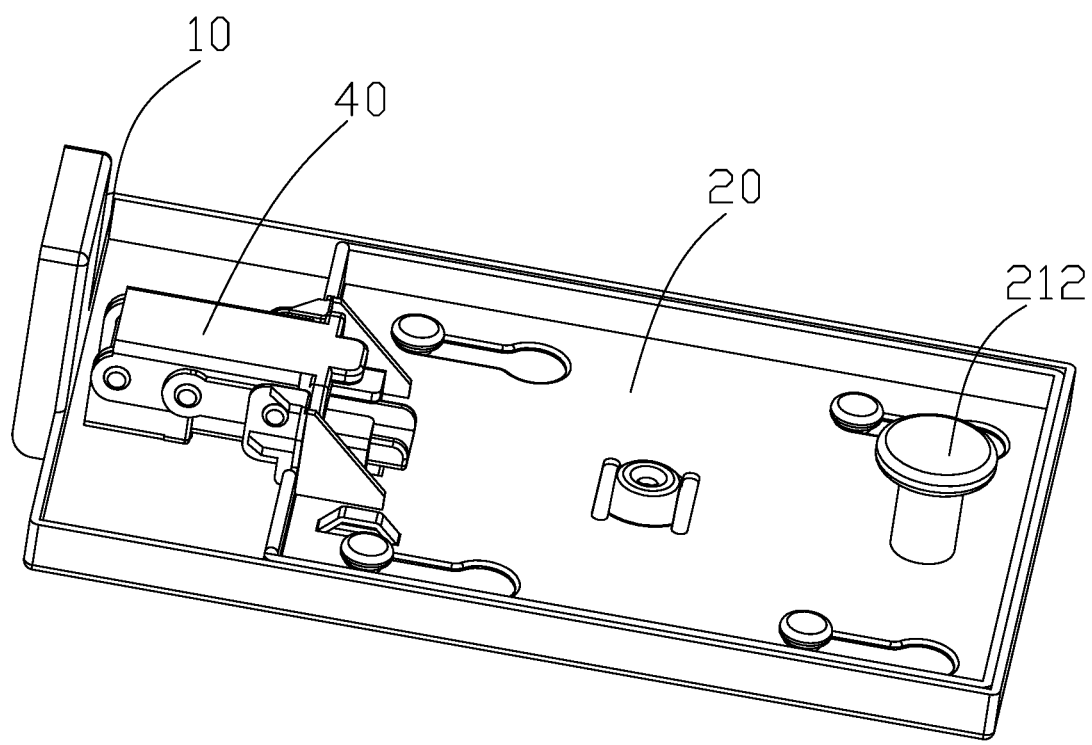
FIG. 3 is a schematic structural diagram of a mainboard mounting mechanism (the mainboard is at an engagement position) according to certain embodiment(s) of the present disclosure.

As shown in FIGS. 1 to 3, the mainboard mounting mechanism includes a chassis box 10, a tray 20, a positioning post 30, and a rod assembly 40.

Figure 4:
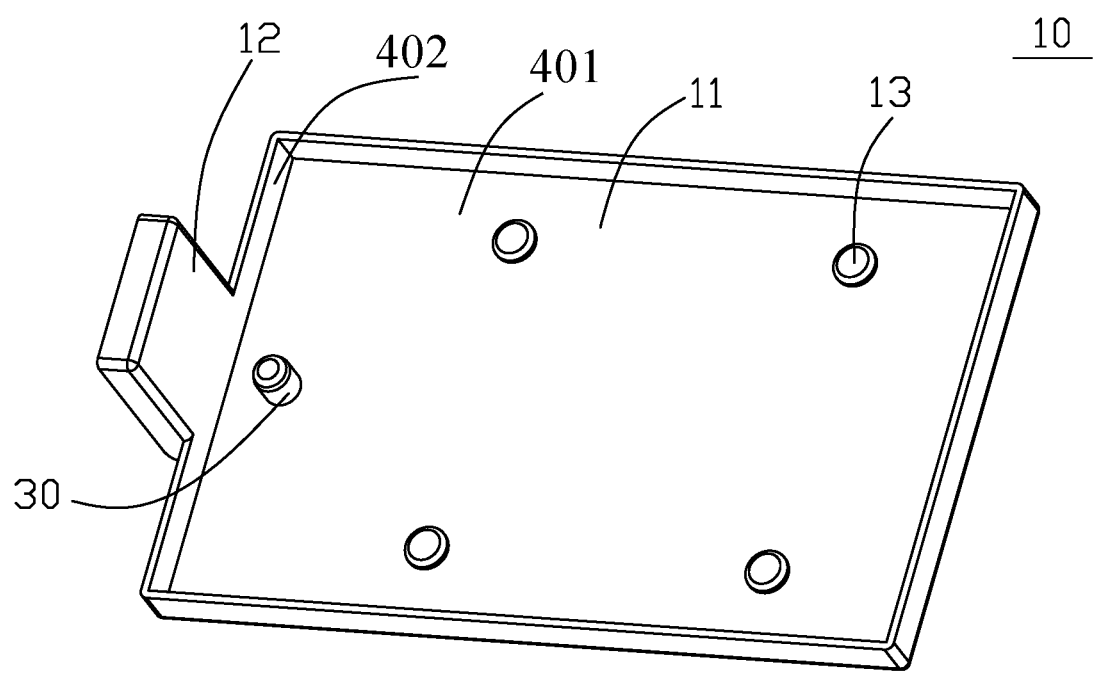
FIG. 4 is a schematic diagram of a partial structure of a chassis box according to certain embodiment(s) of the present disclosure.

The chassis box 10 defines an accommodating space 11, and the accommodating space 11 is used for accommodating the tray 20. When the mainboard mounting mechanism is applied to the electronic device, the chassis box 10 may directly be the chassis of the electronic device. Referring to FIG. 4, in addition to the accommodating space 11, the chassis box 10 also has a positioning portion 12 and a positioning column 13. In certain embodiment(s), the chassis box 10 includes a box floor 401 and a plurality of box walls 102. The box floor 401 and the plurality of box walls 402 together form the accommodating space 11, the positioning portion 12 may be a part of one of the side boxes 402, and the positioning column 13 may be arranged on the box floor 401 and protrude toward the accommodating space 11. The positioning portion 12 and the positioning column 13 are used for positioning the tray 20.

The tray 20 is slidable in the accommodating space 11 and divides the accommodating space 11 into a mounting area 101 and a sliding area 102 in the sliding direction X (the sliding direction is also the first direction in the following description). The tray 20 is used to carry the mainboard. To carry the mainboard, the tray 20 has a holding space 201 capable of carrying the mainboard. In view of FIG. 1 and FIG. 5, the tray 20 includes a tray floor 21 and a plurality of tray walls 22, the tray floor 21 and the plurality of tray walls 22 together form the holding space 201. The plurality of tray walls 22 includes a proximal tray wall 221 positioned in the mounting area 101. The mounting area 101 is to the left of the proximal tray wall 221, from the perspective view of FIG. 1. The sliding area 102 is part of the mounting area 101 other than the mounting area 101, the tray 20 slides in the sliding area 102, and defines a maximum sliding distance S. For When the tray 20 is four sided, there are four tray walls 22, the tray wall 22 opposite to the proximal tray wall 221 is a distal tray wall 222, and to engage with the tray 20 that is four sided, the chassis box 10 is also four sided. When the tray 20 is positioned in the accommodating space 11, one of the plurality of box walls 402 is opposite to the distal tray wall 222. To differentiate, the box wall 402 sitting opposite to the distal tray wall body 222 is termed first box wall 1021. According to FIG. 1, a distance between the first box wall 1021 and the distal tray wall 222 defines the maximum sliding distance S. It should be noted that the shape of the tray 20 can be reasonably set according to the shape of the mainboard, including but not limited to the four-sided tray 20 shown in the drawings, as long as the mainboard can be supported and the accommodating space 11 can be divided into the mounting area 101 and the sliding area 102 based on the tray 20.

The positioning post 30 is fixedly arranged in the mounting area 101. The positioning post 30 is used as a reference for the tray 20 to slide. The positioning post 30 may be integrally formed with the chassis box 10. As shown in FIG. 4, the positioning post 30 is integrated with the chassis box 10. Alternatively, and in an embodiment not shown, the positioning post 30 may also be formed separately of the chassis box 10.

The rod assembly 40 is used as a power transmission for causing the tray 20 to slide. In certain embodiment(s), the rod assembly 40 is located outside the holding space 201 and is rotatably connected to the tray 20. The rod assembly 40 can rotate under the action of an external force, and the rod assembly 40 can be folded or unfolded based on the rotation, so as to drive the tray 20 to slide toward the positioning post 30 and hence for the mainboard to be in a disengagement position (as shown in FIG. 1, the mainboard is at a disengagement position, and when the mainboard is at the disengagement position, disengagement of the mainboard can be achieved by pulling up the connecting rod 40 to separate the tray 20 from the chassis box 10) or drive the tray 20 to slide away from the positioning post 30 so that the mainboard is at an engagement position, (as shown in FIG. 3, the mainboard is in the engagement position, when the mainboard is at the engagement position, the mainboard is secured as required relative to the chassis box 10)

Figure 7:
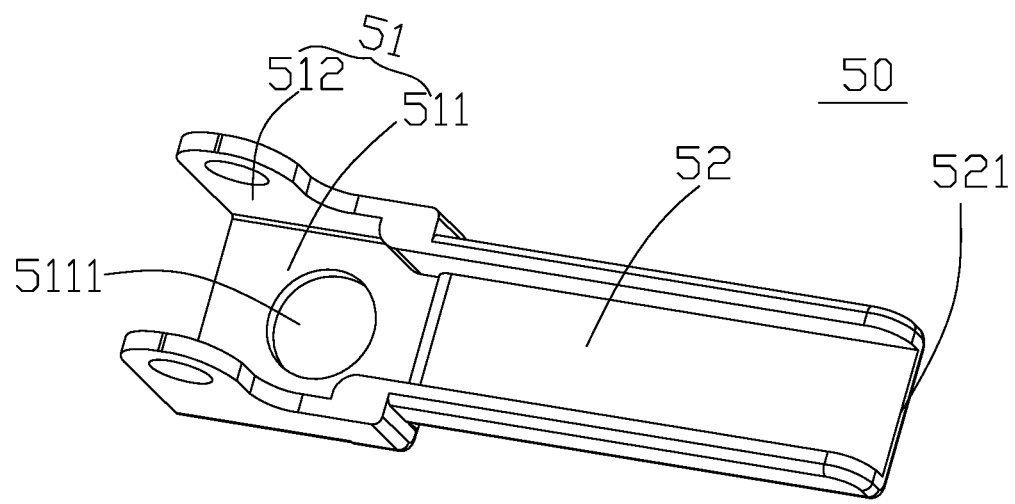
FIG. 7 is a schematic diagram of a guide member according to certain embodiment(s) of the present disclosure.

To provide guidance when the tray 20 slides, the mainboard mounting mechanism further includes a guide member 50 for guiding the tray 20 to slide in a first direction. The first direction may be the X direction as shown in FIG. 1. As shown in FIG. 7, the guide member 50 includes a guide base 51 and a guide rail 52 extending from one side of the guide base 51. The guide base 51 is secured outside the holding space 201 through the positioning column 30, and the tray 20 is slidably connected to the guide rail 52. In certain embodiment(s), the guide base 51 includes a guide base floor 511 and a guide base wall 512. The guide base floor 511 is provided with a positioning hole 5111, and the positioning post 30 is received through the positioning hole 5111 to secure the guide member 50 on the chassis box 10. There are two guide base walls 512, and the two guide base walls 512 are arranged opposite to each other. The guide base wall 512 is used for hinged connection with the first end 4101 of the first part 41. The guide rail 52 extend close to the proximal tray wall 221 and has an extending end 521 capable of extending into the holding space 201. In order to avoid occupying too much of the holding space 201, when the mainboard is at the engagement position, the extending end 521 does not protrude into the space 201. Even when the mainboard is at the disengagement position, the length of a distance at which the guide rail 52 protrudes into the holding space 201 does not exceed the maximum sliding distance S. The guide member 50 is provided to guide the tray 20 for sliding. In certain embodiment(s), the guide rail 52 can be omitted when the mainboard is not too long in length and the guide is not required, and the guide base floor 511 is integrally formed with the box floor 401.

Figure 6:
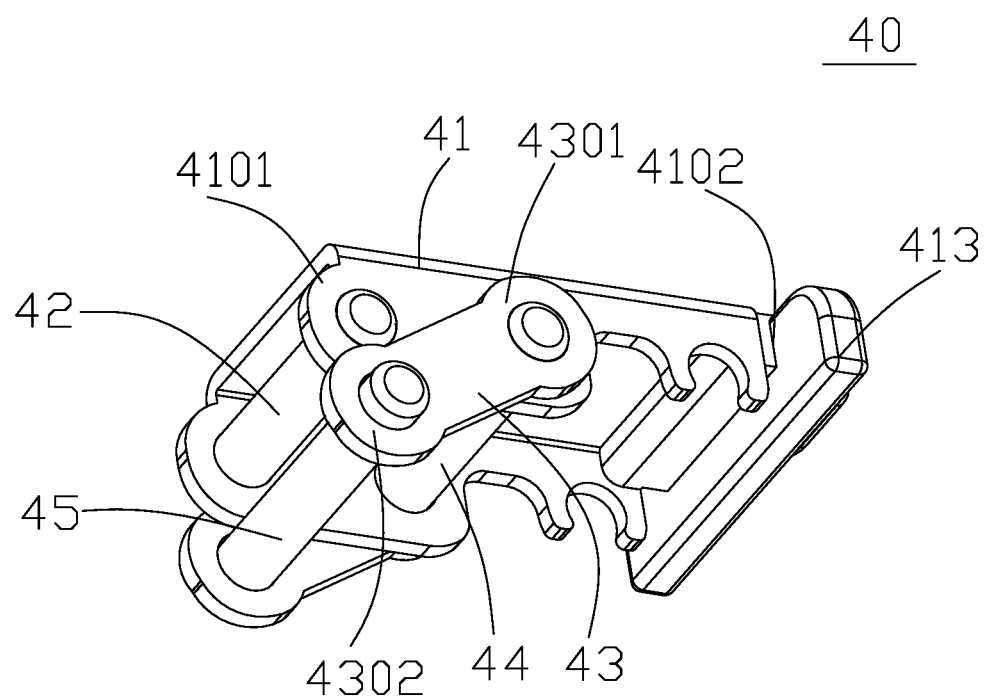
FIG. 6 is a schematic diagram of a rod assembly according to certain embodiment(s) of the present disclosure.

To facilitate the connection of the rod assembly 40 to the tray 20 so that the rod assembly 40 drives the tray 20 during the folding or unfolding process, an ear 2211 extends from the proximal tray wall 221 and toward the outside of the holding space 201, and the rod assembly 40 is connected to between the guide base 51 and the ear 2211. As shown in FIG. 6, the rod assembly 40 includes a first part 41 and a second part 43; the first part 41 includes a first end 4101, a second end 4102, and a mounting portion 411 formed between the first part 41 and the second end 4102; the first end 4101 is hinge connected to the guide base 51 through the first rod 42. A handle portion 412 is formed at the second end 4102, and an external force can be applied to the first part 41 through the handle portion 412 to make the first part 41 rotate clockwise or counterclockwise about the first rod 42. The second part 43 includes a third end 4301 and a fourth end 4302. The third end 4301 is hinge connected to the mounting portion 411 through the second rod 44, and the fourth end 4302 is hinge connected to the ear 2211 through the third rod 45. Accordingly, an external force can be applied to the rod assembly 40 through the handle portion 412, and when the rod assembly 40 is rotated, the tray 20 can be driven. The rod assembly 40 is not limited to the two-link structure shown in the drawings, but can also be a three-link or even a four-link structure, as long as the rod assembly 40 can fold or unfold by rotations so as to drive the tray 20.

In the two-link structure given above, the mounting portion 411 divides the first part 41 into a first segment and a second segment, the first segment is defined between the first end 4101 and the mounting portion 411, and the second segment is defined between the mounting portion 411 and the second end 4102, when the first part 41 rotates clockwise under an external force, the angle between the second part 43 and the first segment gradually increases, and the angle between the second part 43 and the second segment gradually decrease. When the first part 41 rotates counterclockwise under an external force, the angle between the second part 43 and the first segment gradually decreases, and the angle between the second part 43 and the second segment gradually increases. Accordingly, the purpose of moving the tray 20 can be achieved by changing the size of the angle between the second part 43 and the first segment. In view of FIG. 1, FIG. 3, and FIG. 6, the angle between the second part 43 and the first segment is increased to 180°, and the angle between the second part 43 and the second segment is reduced to 0°, and the mainboard is at the engagement position; when the angle between the second part 43 and the first segment is reduced to a minimum, and the angle between the second part 43 and the second segment is increased to a maximum, the mainboard is at the disengagement position. It can be seen from FIG. 1, when the first part 41 is substantially perpendicular to the guide rail 52, the angle between the second part 43 and the first segment is reduced to the minimum, and the angle between the second part 43 and the second segment increases to the maximum. When disengaging the mainboard, having the positioning portion 12 in place to resist the first part 41 prevents the sliding stroke of the tray 20 from being greater than the maximum sliding distance S.

In addition, to facilitate the sliding of the tray 20 and then to engage the mainboard at the engagement position, a first buckle 413 is formed on the first part 41, and a second buckle 2212 is formed on the proximal box wall 221. When the mainboard is at the engagement position, the first buckle 413 is engaged with the second buckle 2212, so as to stabilize the mainboard at the engagement position.

Figure 5:
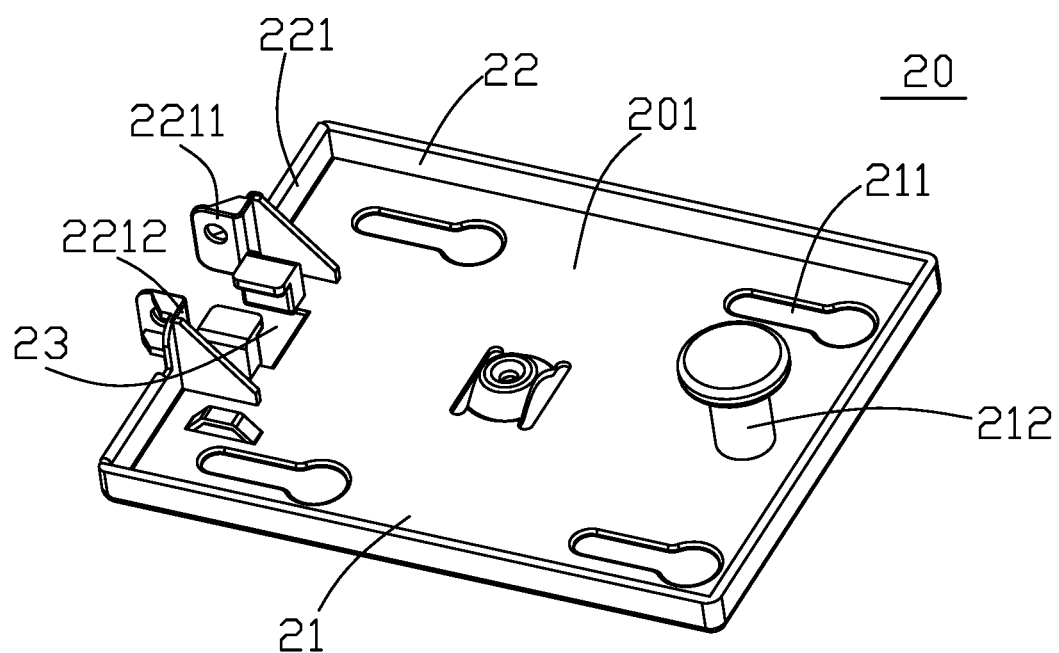
FIG. 5 is a schematic diagram of a tray according to certain embodiment(s) of the present disclosure.

To better guide, the tray floor 21 may also be formed with a slot hole 211 to help limit the translational sliding of the tray 20 along the first direction X. Through an engagement of the positioning column 13 to the slot hole 211, a limit to the translational sliding of the tray 20 along the first direction X can be achieved. The slot hole 211 can be a semicircular hole at both ends, and the semicircle at both ends can be of equal diameter, so that the slot hole 211 is an elongated kidney hole, and the semicircle at both ends can also be unequal diameter as shown in FIG. 5, where the slot hole 211 is a gourd-like hole.

In addition, when the length of the mainboard is relatively large, a handle 212 can protrude out from the tray floor 21 at a location away from the guide rail 52. By applying an external force to the handle portion 412 of the first part 41 and by applying another external force to the handle 212, the mainboard may then be disengaged, while the problem associated with easy tilting of the mainboard applied with only one external force can be solved.

According to another aspect of the present disclosure, an electronic device is also provided, which includes a chassis box and a mainboard installation mechanism, the chassis box includes the accommodating space 11, and the mainboard installation mechanism is as described above, which will not be repeated here. In addition, the chassis and the like of the electronic device may have various existing or future structures, which do not limit the protection scope of the present disclosure.

When the mainboard is installed on the chassis box of the electronic device based on the mainboard mounting mechanism of the present disclosure, the tray 20 is set on the chassis box according to a cooperation between the positioning post 30 and the positioning hole 5111 on the guide base floor 511 (as shown in FIG. 1). Then, an external force is applied through the handle portion 412 to make the first part 41 of the rod assembly 40 rotate clockwise, and the rod assembly 40 is gradually folded to drive the tray 20 to slide away from the positioning post 30 along the first direction X (rightward), for the mainboard to be at the engagement position (as shown in FIG. 3), where the first buckle 413 and the second buckle 2212 are fastened together to stabilize the mainboard at the engagement position; when the mainboard is to be detached from the chassis of the electronic device, an external force is applied through the handle portion 412 to make the first part 41 of the rod assembly 40 rotate counterclockwise, the first buckle 413 is disengaged from the second buckle 2212, and the rod assembly 40 is gradually unfolded, and the tray 20 glides along the first direction X toward the positioning post 30 (leftward) until the mainboard is at the disengagement position (as shown in FIG. 1). Thereafter, an upward pulling force is exerted on the handle portion 412, and at the same time, an upward pulling force is exerted on the handle 212, and the tray 20 is disengaged from the chassis box.

Certain embodiment(s) of the present disclosure has the following beneficial effects: by arranging a rod assembly 40, that can be folded or unfolded based on rotation, outside the holding space 201 of the tray 20, the tray 20 is driven to slide, thereby driving the mainboard to slide back and forth to realize the mainboard assembly operation. This design not only considers the handle and sliding assembly functions, but also allows more space for the mainboard layout, making the mainboard assembly operation more convenient.

In the description of the present disclosure, the orientation or positional relationship indicated by the orientation words such as "left", "right", "upper", "bottom" refers to the orientation or positional relationship shown in the drawings, is to facilitate the description of the present disclosure and to simplify the description. Unless stated to the contrary, these directional words do not indicate or imply that the device or element must have a particular orientation or be constructed and operated in a particular orientation and are not to limit the protection scope of the present disclosure. The directional words "inner" and "outer" refer to the inside and outside relative to the contour of each component itself.

For the ease of description, spatially relative terms, such as "on", "over", "on top of", "above", may be used to describe the spatial positional relationship of one or more components or features in the drawings relative to other components or features. Spatially relative terms encompass not only the orientation of components as depicted in the figures, but also different orientations involved in use or operations. For example, if a component in the figures is turned upside down in its entirety, components "above" or "above other components or features" would include components "below" or "below other components or features". Thus, the term "above" can encompass both an orientation of "above" and an orientation "below." In addition, these components or features may also be oriented at other different angles (for example, rotated 90 degrees or other angles), all of which are intended to be encompassed herein.

The terminology used herein is for the purpose of describing specific embodiments only, and is not intended to limit the embodiments according to the present disclosure. As used herein, unless the context clearly dictates otherwise, the singular is intended to include the plural as well, furthermore, it is to be understood that when the terms "comprising" and/or "including" are used in the present disclosure, the terms refer to features, steps, operations, parts, components and/or combinations thereof.

Terms such as "first" and "second" in the description and claims of the present disclosure and the above drawings are used to distinguish similar objects, and are not necessarily used to describe a specific sequence or sequence. Data so used may be interchanged under appropriate circumstances so that the embodiments of the disclosure described herein can also be practiced in sequences other than those illustrated or described herein.

The present disclosure has been described according to the above-described embodiments, but the above-described embodiments are only for the purpose of illustration and description, and are not intended to limit the present disclosure to the scope of the described embodiments. In addition, those skilled in the art can understand that the present disclosure is not limited to the above-mentioned embodiments, and variations and modifications can be made according to the teachings of the present disclosure, which all fall within the protection claimed in the present disclosure. The scope of protection of the present disclosure is defined by the appended claims and their equivalents.

What is claimed is:

1. A mainboard mounting mechanism for use with a chassis box, the chassis box defining an accommodating space, the mainboard mounting mechanism comprising:
 a tray, slidably arranged in the accommodating space and divides the accommodating space into a mounting area and a sliding area along a sliding direction, the tray defines a holding space for holding a mainboard;
 a positioning post, positioned in the mounting area;
 a guide member, with a positioning hole accommodating the positioning post, the guide member including a guide base with the position hole and a guide rail extending from the guide base, and the tray is slidably connected with the guide rail; and
 a connecting rod assembly, rotatably connected to the tray, wherein the connecting rod assembly drives the tray to slide toward the positioning post so as for the mainboard to be at a disengagement position, and the connecting rod assembly drives the tray to slide away from the positioning post for the mainboard to be at an engagement position.

2. The mainboard mounting mechanism of claim 1, wherein the connecting rod assembly is positioned outside of the holding space.

3. The mainboard mounting mechanism of claim 1, wherein the positioning post is received through the positioning hole for the guide member to be connected to the chassis box.

4. The mainboard mounting mechanism of claim 1, wherein the tray comprises a tray floor and a tray wall, the tray floor and the tray wall together define the holding space.

5. The mainboard mounting mechanism of claim 1, wherein the tray comprises a tray floor and a plurality of tray walls together defining the holding space, the plurality of tray walls include a proximal tray wall and a distal tray wall opposing the proximal tray wall, and wherein the guide rail extend from the proximal tray wall toward the distal tray wall.

6. The mainboard mounting mechanism of claim 5, wherein an ear extends from the proximal tray wall and the connecting rod assembly is positioned between the guide base and the ear.

7. The mainboard mounting mechanism of claim 1, wherein the connecting rod assembly comprises:
a first part, including a first end, a second end, and a mounting portion positioned between the first end and the second end; and
a second part, rotatably connected to the mounting portion of the first part.

8. The mainboard mounting mechanism of claim 7, wherein the first end is rotatably connected to a guide base through a first rod.

9. The mainboard mounting mechanism of claim 7, wherein the second part includes a third end and a fourth end, and the third end is rotatably connected to the mounting portion.

10. The mainboard mounting mechanism of claim 7, wherein the mounting portion divides the first part into a first segment and a second segment, the first segment is defined between the first end and the mounting portion, the second segment is defined between the mounting portion and the second end, when the first part rotates clockwise, an angle between the second part and the first segment gradually increases, and an angle between the second part and the second segment gradually decreases, and when the first part rotates counterclockwise, the angle between the second part and the first segment gradually decreases, and the angle between the second part and the second segment gradually increases.

11. The mainboard mounting mechanism of claim 7, wherein a first buckle is present on the first part, and a second buckle is present on the tray, when the mainboard is at the engagement position, the first buckle is buckled with the second buckle.

12. An electronic device, comprising:
a chassis box and a mainboard mounting mechanism, the chassis box defining an accommodating space, and the mainboard mounting mechanism comprising:
a tray, slidably arranged in the accommodating space and divides the accommodating space into a mounting area and a sliding area along a sliding direction, the tray defines a holding space for holding a mainboard;
a positioning post, positioned in the mounting area;
a guide member, with a positioning hole accommodating the positioning post, the guide member including a guide base with the position hole and a guide rail extending from the guide base, and the tray is slidably connected with the guide rail; and
a connecting rod assembly, rotatably connected to the tray, wherein the connecting rod assembly drives the tray to slide toward the positioning post so as for the mainboard to be at a disengagement position, and the connecting rod assembly drives the tray to slide away from the positioning post for the mainboard to be at an engagement position.

13. The electronic device of claim 12, wherein the connecting rod assembly is positioned outside of the holding space.

14. The electronic device of claim 12,
wherein the positioning post is received through the positioning hole for the guide member to be connected to the chassis box.

15. The electronic device of claim 12, wherein the tray comprises a tray floor and a tray wall, the tray floor and the tray wall together define the holding space.

16. The electronic device of claim 12, wherein the tray comprises a tray floor and a plurality of tray walls together defining the holding space, the plurality of tray walls include a proximal tray wall and a distal tray wall opposing the proximal tray wall, and wherein the guide rail extend from the proximal tray wall toward the distal tray wall.

17. The electronic device of claim 16, wherein an ear extends from the proximal tray wall and the connecting rod assembly is positioned between the guide base and the ear.

18. A method of holding a mainboard to a chassis box through a mainboard mounting mechanism, the chassis box defining an accommodating space, the method comprising:
providing the mainboard mounting mechanism, wherein the mainboard mounting mechanism comprises:
a tray, slidably arranged in the accommodating space and divides the accommodating space into a mounting area and a sliding area along a sliding direction, the tray defines a holding space for holding a mainboard;
a positioning post, positioned in the mounting area;
a guide member, with a positioning hole accommodating the positioning post, the guide member including a guide base with the position hole and a guide rail extending from the guide base, and the tray is slidably connected with the guide rail; and
a connecting rod assembly, rotatably connected to the tray, wherein the connecting rod assembly drives the tray to slide toward the positioning post so as for the mainboard to be at a disengagement position, and the connecting rod assembly drives the tray to slide away from the positioning post for the mainboard to be at an engagement position.

* * * * *